Oct. 19, 1971  C. L. LOUTHAN  3,613,290
TROLLING UNDERWATER FISHING KITE
Filed Feb. 24, 1970  2 Sheets-Sheet 1
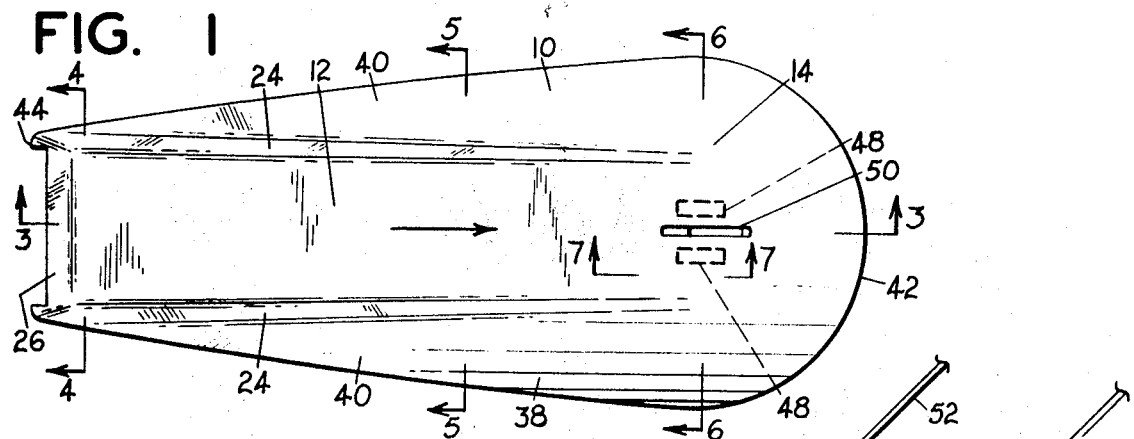
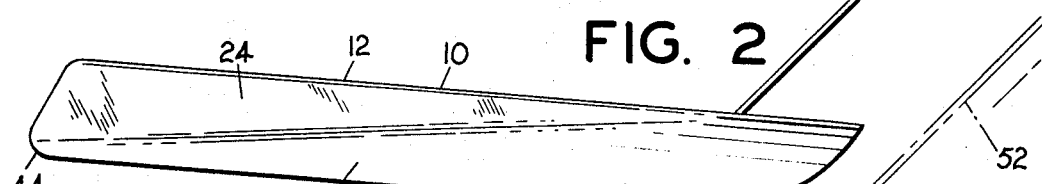
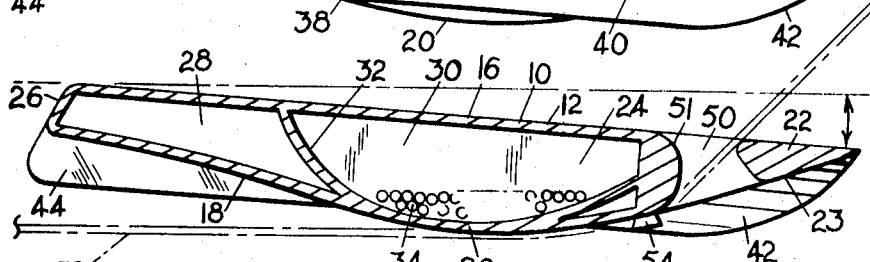
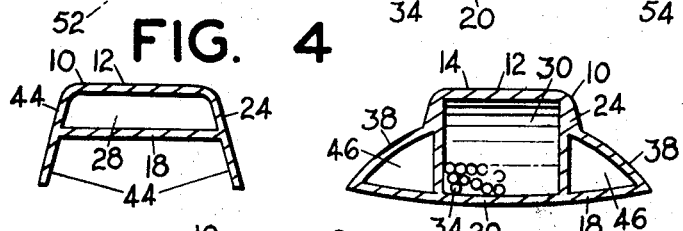
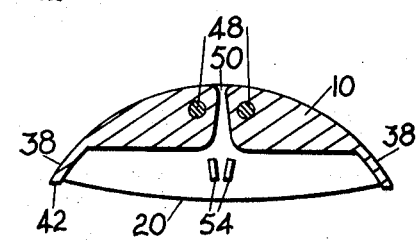
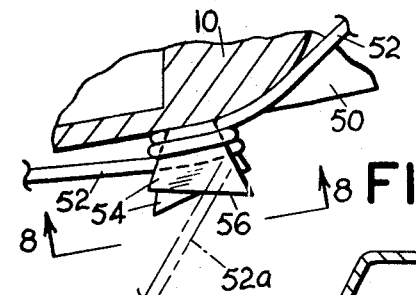
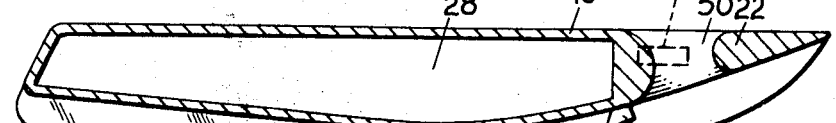
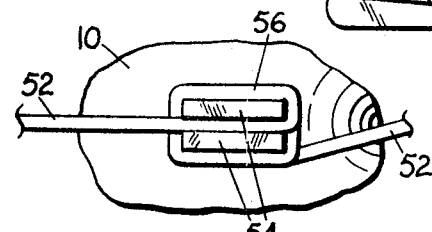
CLISSOLDE L. LOUTHAN
INVENTOR.
BY *Eugene M. Eckelman*
ATTY.

Oct. 19, 1971     C. L. LOUTHAN     3,613,290

TROLLING UNDERWATER FISHING KITE

Filed Feb. 24, 1970     2 Sheets-Sheet 2

CLISSOLDE L. LOUTHAN
INVENTOR.

BY Eugene M. Eckelman
ATTY.

United States Patent Office 3,613,290
Patented Oct. 19, 1971

3,613,290
TROLLING UNDERWATER FISHING KITE
Clissolde L. Louthan, 7477 N. Wayland,
Portland, Oreg. 97203
Filed Feb. 24, 1970, Ser. No. 13,309
Int. Cl. A01k 93/00
U.S. Cl. 43—43.13
16 Claims

ABSTRACT OF THE DISCLOSURE

A trolling underwater fishing kite having a buoyant wedge-shaped body portion with vane means extending along the sides and around the front and assuming a narrowed tapered configuration toward the rear. The vane means at the front is concave downwardly as viewed in transverse cross section. The bottom of the body portion has a downward curvature at about the center of gravity of the kite. The body portion is buoyant and has a formation of mass arranged such that when laid in water the forward end of the body portion noses down a slight amount. The body portion may include longitudinally shiftable ballast means which assist in performance of the kite. The forward portion of the kite has a vertical slot for receiving the fish line, and the bottom of the kite carries a slotted projection having disengageable connection with the fish line whereby when a fish strikes, the kite floats up the line to the surface to an inoperative position.

BACKGROUND OF THE INVENTION

This invention relates to new and useful improvements in fishing kites or diving devices of the type arranged to be used in lieu of lead sinkers for submerging a bait line in water to a desired depth.

Various types of fishing kites or diving devices have heretofore been used for the purpose of submerging a bait for trolling. Such devices have been utilized in lieu of relatively heavy sinkers or weights since the lead sinkers have numerous disadvantages; namely, they create a drag on the line when a fish is being landed, thus being the result of many lost fish; they sink to the bottom when the boat stops or turns; and they are dangerous in a boat when being inserted and removed from the water because they swing back and forth with the swaying of the boat and often strike the passengers. Attempts have been made to solve the problem by means of kiting devices, and as examples, reference is made to Pat. Nos. 2,247,583, 2,273,209 and 2,566,029 secured by the present applicant. Although the kiting devices of the mentioned patents worked very good, they, and prior art devices, had certain disadvantages. For example, such devices have projecting bails and working parts which interfere with operation of the kite and are easily snagged and tangled with the line. Also, prior devices of this type are not capable of diving to a desired depth and then automatically maintaining a constant depth. Also, such devices sink if the boat should slow down or turn a corner and thus could snag on the bottom. Also, these devices sink if the line should accidentally break and of course are lost. Further yet, prior devices are not sufficiently stable in the water to track behind a boat with the necessary accurateness to prevent fishing lines of the boat from becoming entangled, and because of the projecting bails and other working parts, they are also expensive to manufacture.

SUMMARY OF THE INVENTION

A primary objective of the present invention is to provide an underwater fishing kite which comprises a substantial improvement over prior art devices. More particularly, an object of the present invention is to provide a kite of the type described having a novel body construction and body contour which does not have moving parts or projecting hardware and thus provides a structure which is inexpensive and is not easily snagged on foreign objects or tangled with a fish line. The body shape also contributes to efficient diving functions of the kite, as well as improved stability with relation to prior art devices, and which will automatically maintain a fishing depth at a selected trolling speed. If the boat should stop or the line break, the kite will surface.

Another object of the present invention is to provide an underwater fishing kite which has a novel connection to the fishing line, such connection contributing to the effective operation of the kite and also employing means which readily and automatically disengage the connection between the kite and the line when a fish strikes, allowing the kite to slide up the line to an out-of-the-way inoperative position. For this purpose, the body portion of the kite has sufficient buoyancy to cause the said kite to slide up the line when disconnection from the line occurs.

Another object of the invention is to provide an underwater fishing kite of the type described having a body portion with a movable ballast portion serving to provide a more effective performance of the kite in its diving and trolling operations.

Another object of the present invention is to provide a device of the type described which is extremely simplified in operation and inexpensive to manufacture.

The invention will be better understood and additional objects and advantages will become apparent from the following description taken in connection with the accompanying drawings which illustrate preferred forms of the device.

BRIEF DESCRIPTION OF THE DRAWINGS

FIG. 1 is a top plan view of an underwater fishing kite embodying features of the present invention;

FIG. 2 is a side elevational view of the kite;

FIG. 3 is a longitudinal sectional view taken on the line 3—3 of FIG. 1;

FIGS. 4, 5 and 6 are transverse sectional views taken on the lines 4—4, 5—5 and 6—6 of FIG. 1, respectively;

FIG. 7 is an enlarged fragmentary sectional view taken on the line 7—7 of FIG. 1;

FIG. 8 is a fragmentary plan view taken on the line 8—8 of FIG. 7;

FIG. 9 is a longitudinal sectional view, similar to FIG. 3, but showing a somewhat different form of kite construction;

DETAILED DESCRIPTION OF THE PREFERRED EMBODIMENTS

Figure 14:
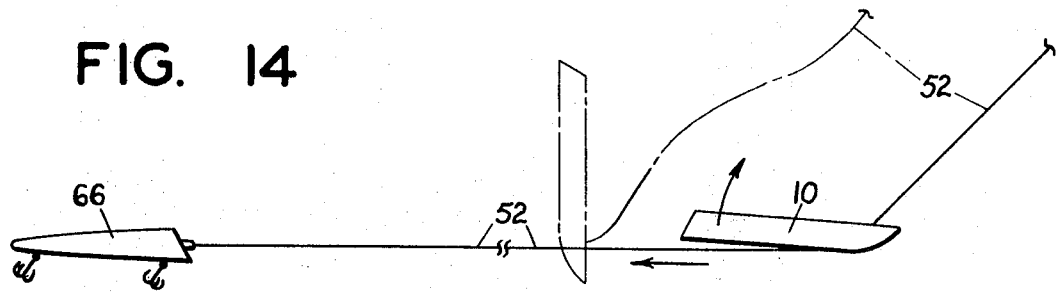
FIG. 14 is a side elevational view of the present kite in operation and showing in phantom lines a position of the kite immediately after a strike from a fish.

Referring first to FIGS. 1–6, the present underwater fishing kite is designated generally by the numeral 10.

Such kite has a body portion 12 which is substantially uniform in width, FIG. 1, and as viewed from the side, FIG. 2, assumes a wedge-shaped configuration, with the reduced end 14 being disposed toward the front. With particular reference to FIG. 3, the top wall 16 of the body portion 12 is substantially straight and the bottom wall 18 angles downward slightly from the top wall toward the front and leads into arcuate portion 20 intermediate the ends of the kite. The forward end of body portion 12 comprises a solid tapered extension 22 terminating at the front end in a thin edge. Such extension has a bottom surface 23 which leads from the forward end into the arcuate portion 20. Body portion 12 has side walls 24 which as best seen in FIGS. 1 and 4 are tapered upwardly to a narrower dimension.

Body portion 12 has a rear wall 26 and is fully enclosed by the walls 16, 18, 24 and 26 and extension 22 to form an inner airtight compartment 28 which makes the kite buoyant. The buoyancy is sufficient to float the kite, together with any weight which may be added thereto from a trailing fish line and hook assembly. Body portion 12 may comprise a solid piece of buoyant material instead of the air compartment 28 for achieving buoyancy for the kite.

Compartment 28 has an auxiliary compartment 30 formed by an arcuate wall 32 connected at its forward end to the front end extension 22 and at its rearward end to the top wall 16 of body portion 12. Wall 32 extends fully between the side walls 24 and thus forms an enclosed compartment. Contained in the compartment 30 is ballast material 34 which may comprise any substance having a fluid-like action. As an example, the ballast may comprise small shot, it being desired that such ballast material be freely movable forward and rearwardly upon longitudinal tilting of the kite.

Extending around the sides and front of the body portion 12 is a vane 38. As best seen in FIG. 1, vane 38 leads from adjacent the rearward end of body portion 12 into a flared or wider dimension toward the front. The vane 38 along its side edges 40 is substantially straight in its flared direction and such side edges lead into a rounded front edge 42. The rounded front edge 42 terminates rearwardly at about the rearward extremity of solid front end extension 22, and the front end 42 is not only arcuate in configuration as seen in plan but also is concave downward as seen from the front or transverse cross section. FIG. 6. The kite in trolling operation cuts efficiently through the water with the water engaging along the upper surface of the vane 38 for longitudinal stability. Water also moves along the lower wall surface 23 between the downturned front vane portions to provide a transverse stable movement of the kite therethrough. In addition, the tapered upright side walls 24 of the body portion 12 serve as a rudder for the device, to maintain a stable forward movement in the water. Water impinges against the undersurface 23 as the kite moves forwardly and then impinges along the arcuate portion 20 of bottom wall 18. As the water leaves the arcuate surface of portion 20 it is directed up against the rear surface of bottom wall 18. Impingement of the water against the rear surface of bottom wall 18 serves to lift the back end of the kite slightly to assist in its diving function.

The rearwardmost portions of side vanes are turned downwardly to form rear fins 44, best seen in FIGS. 3 and 4. The movement of the water out the rearward end of the kite between the fins 44 further acts as stabilizing means for forward movement of the kite.

The side vane portions thus extend from the turneddown ends or fins 44 to an outwardly flaring position with less angle to the horizontal than the fins. The general downward angle of the side vane portions is illustrated in FIG. 5, namely, about 35° relative to the horizontal. Also seen in FIG. 5, the bottom wall 18 may extend beyond the sides of the body portion 12 and be secured to the underside of the vane portions. Such attachment provides reinforcement for the vane and also forms air pockets 46 along the sides of the body portion for added buoyancy. The vane at the front leads into the front end extension 22 and forms side extensions thereof, as shown in FIG. 6.

The compartment 30 is provided in the body portion of the kite in a selected position such that the lowermost point thereof is substantially at the longitudinal center of gravity of the kite. It is desired, however, that when the kite be placed on water that the front end nose down slightly at about an angle illustrated in FIGS. 2 and 3. For this latter purpose, the solid front end extension 22 is provided with one or more weights 48.

Front end extension 22 is provided with a longitudinally elongated slot 50 defined at the front and rear by gently curved walls 51, FIG. 3. This slot is arranged to receive a fish line 52, as best shown in FIG. 3. Means is provided for detachably connecting the fish line to the kite on the bottom side of the latter, and such means comprises a pair of posts 54, best seen in FIGS. 7 and 8, which project downwardly from the kite and are disposed approximately at the rearward end of the slot 50. The two posts 54 are selectively spaced laterally and are angled toward each other slightly, FIG. 6, so that the fish line in being inserted therebetween must be forced in place. That is while the base portions of the posts are spaced sufficiently apart to freely receive the fish line, the outer ends thereof are angled toward each other so that the fish line must be frictionally forced into the area between the posts. As best seen in FIG. 7, the posts 54 have oppositely projecting corners 56 which assist in inserting the fish line in the area between the posts. That is, the fish line extending down through the slot 50 is detachably connected to the kite by wrapping it one or more times around both posts 54 and then inserting it between the posts from front to rear. The projecting corners of the posts permit easy threading of the fish line into the area between the posts as it is being brought rearwardly from the front. A phantom line position 52a of the fish line is shown in FIG. 7 in the step of inserting said line between the posts just after it is brought against corner 56 of the post 54 nearest to the viewer. FIG. 8 is a view from the bottom showing the fish line wrapped around the posts 54 and threaded between the latter.

FIG. 9 illustrates a modified form of kite 10' such form being modified only to the extent that it does not use ballast material. The structure of FIG. 9 is otherwise identical to the structure of FIGS. 1–6. Without the ballast material, the compartment 28 can extend the full length between the rearward end of the kite and the front end portion 22.

Figure 10:
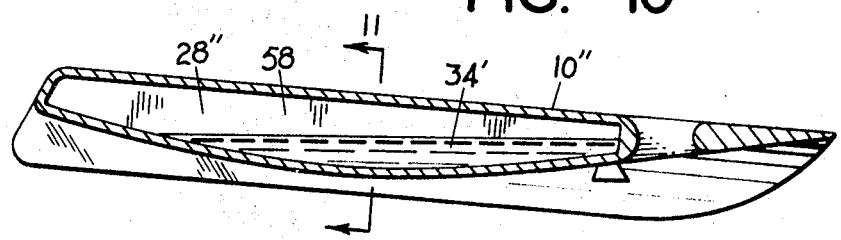
FIG. 10 is a view similar to FIG. 9 and showing still another form of kite construction.
Figure 11:
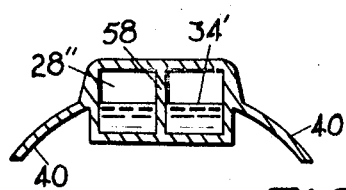
FIG. 11 is a vertical sectional view taken on the line 11—11 of FIG. 10.

FIGS. 10 and 11 show another form of the kite 10" wherein compartment 28" has a liquid ballast 34' therein. Compartment 28" has a central longitudinal partition 58 which breaks up any massive action of the ballast liquid 34. By means of such partition, the ballast material 34' is available for longitudinal functioning in the kite but partition 58 prevents any side sway which may result from side movement of the entire mass.

Figure 12:
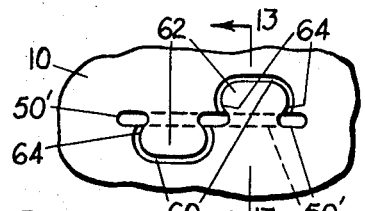
FIG. 12 is a fragmentary plan view of a portion of the present kite showing a modified form of line-receiving slot for varying the position at which a fish line engages the device.
Figure 13:
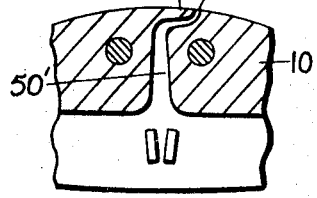
FIG. 13 is a fragmentary sectional view taken on the line 13—13 of FIG. 12.

FIGS. 12 and 13 illustrate a modified form of slot structure 50'. The purpose of such structure is to provide adjustable longitudinal positioning of the fish line 52 in its point of passing vertically through the front end of the kite. For this purpose, slot 50' has one or more arcuate lateral extensions 60 by means of which the line may be moved from one longitudinal point of the slot to another. That is, the line can be manually threaded forwardly or rearwardly in the slot 50' by threading it around an arcuate extension 60, and since the line is subsantially parallel with the slot in normal trolling operations, it will stay where it has been adjustably positioned. In a preferred arrangement, horizontal wall portions 62 which extend across the slot 50' to form the arcuate slot extensions 60 have forward and rearward recesses 64 in which the line will be engaged with no possibility that it will accidentally thread itself around one of the extensions 60. The positioning of the line at different longitudinal places relative to the kite in the slot 50', controls the depth at which the kite will troll. That is, the farther forward the line is placed in the slot 50' the shallower the troll will be.

OPERATION

To rig the present device for use, the hook end of the line is threaded vertically down through the slot 50. Such is necessary before installing the lure 66 or hook assembly. In a trolling position, it is desired that the lure 66 trail behind the kite 10 by at least a few feet, FIG. 14. Upon deciding such selected distance and adjusting the line through the slot 50, said line is wrapped one or more times around the posts 54 and detachably connected to the posts by threading it therebetween. The frictional fit of the line between the posts and the wrapped engagement therewith will hold it in place for normal trolling operations. With the kite 10 attached to the line as just described and the lure 66 attached to the hook, the assembly is placed on the water. As was described, the center of gravity of the kite 10 is such that it will nose down slightly in the water seated thereon, such nosing down position being accomplished by the weights 48.

Upon the application of a forward trolling speed, the kite, already being nosed down slightly, will dive immediately. As the kite dives, the ballast 34 or 34' moves forwardly and assist in the dive. The dive will continue until the kite has moved the fish line 52 to such an angle that the latter will urge the nose of the kite upwardly. This, of course, will level out the kite to trolling position. If the trolling speed is too fast, the nose will continue to be lifted by the line and the kite will climb upwardly. Thus, an excessive trolling speed cannot be maintained. A fisherman can tell if his trolling speed is too fast because if the kite is ascending, the angle of the line is less relative to the horizontal than the preferred trolling speed. If the trolling speed is proper, the kite will maintain itself relative to the fish line at about a 45° angle. If this angle is less than 45°, the fisherman knows that the kite is ascending and he should slow down. The kite maintain its proper depth if the speed is proper because, as stated, as soon as it reaches the depth desired the angle of the line will cause the nose to pull up and level off the kite. The depth to which the kite will dive depends upon the longitudinal positioning of the slot 50. As stated hereinbefore, the farther forward that the line is disposed the shallower will be the dive. If it is desired that the diving depth be adjustable on one kite, the structure of FIGS. 12 and 13 may be utilized.

When a fish strikes the bait, the sudden backward pull on the fish line causes the kite to flip up to a substantially vertical position. Such a vertical position is shown in phantom lines in FIG. 14. This puts the bait end of the fish line straight out from the posts 54 and the line then pulls out from between the posts and unravels therefrom. This will disconnect the line from the kite and the kite being buoyant will then slide up the line to the surface. The kite is rendered inoperative and does not interfere with the landing of the fish.

Figure 16:
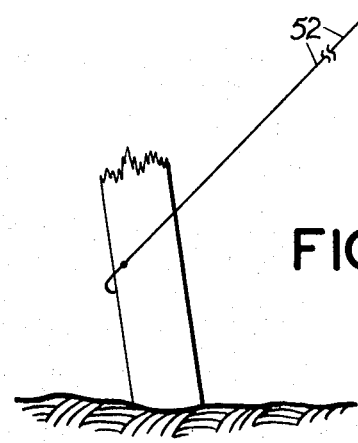
FIG. 16 is a side elevational view showing the operation of the present kite when the fish hook has become snagged.

If the hook should become snagged, and there is danger of losing the kite 10, it is merely necessary to jerk firmly on the fish line which will flip up the kite 10 to the position shown in FIG. 16 and the line will become disengaged from the posts 54. The kite 10 being buoyant will then slide up the line, and the hook can then be broken off without fear of losing the kite.

Figure 15:
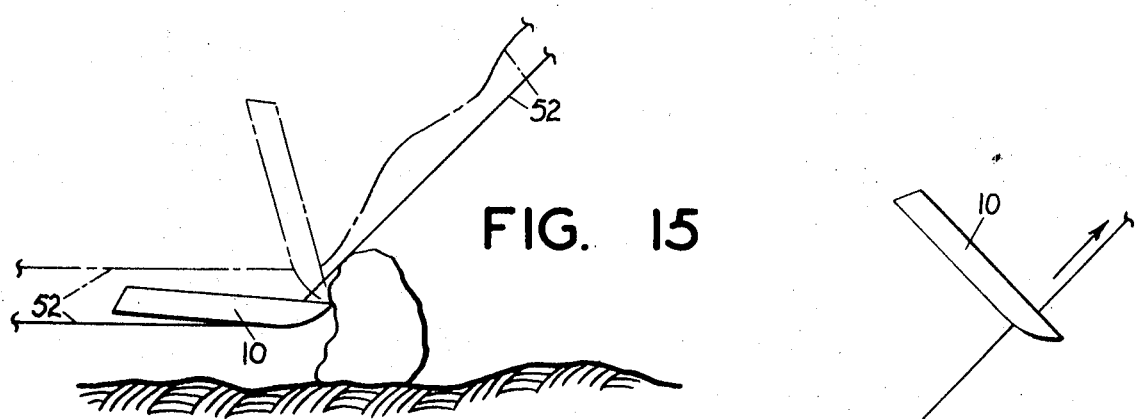
FIG. 15 is a side elevational view of the present kite and showing in phantom lines its manner of working free from an obstruction.

If the kite of the present invention should engage an obstruction, such as a rock shown in FIG. 15, it will generally flip up over the obstruction in a manner shown in phantom lines. After it has moved over the rock it will level off in its normal trolling position. Usually, even though the kite has flipped up to a substantially vertically position, the weight of the bait will not pull the line off the posts 54 and the kite will level off and resume its trolling position.

Also, if seaweed or other debris should catch on the present kite or on the fish line at the kite when trolling, it is merely necessary to pull up on the line a few feet and release it suddenly. Such action causes the kite to flip to an upstanding position with the rearward end disposed upwardly. With the kite thus flipped up, the seaweed backs off from the kite and line.

The improved functioning of the present kite is accomplished by its particular body structure and shape, namely, the wedge shape of the body portion 12 and the shape of the vane 38. Also, the diving function thereof is assisted by the particular curvature of the bottom surface of the device wherein the water flowing over the rounded portion 20 impinges against the rearward portion of bottom wall 18 to cause the nose to angle down. The body portion 12 serves as a rudder for longitudinal stability and the vane 38 imparts lateral stability and also longitudinal stability. The device will track precisely behind a boat and when turned at a short angle will not flop over but will merely turn end for end when a critical angle of the line and the kite exists.

It is to be understood that the forms of my invention herein shown and described are to be taken as preferred examples of the same and that various other changes in the shape, size and arrangement of parts may be resorted to without departing from the spirit of my invention or the scope of the subjoined claims.

Having thus described my invention, I claim:

1. An underwater fishing kite comprising:
   (a) a buoyant body portion having top and bottom walls, side walls, and forward and rearward ends,
   (b) said body portion assuming substantially a wedge shape as viewed from the side, with the reduced end being disposed toward the front,
   (c) the side walls of said body portion serving a a rudder to provide stability of the kite in its movement through the water,
   (d) an outwardly projecting vane extending around the sides and front of said body portion providing lateral stability in its movement through the water,
   (e) and connector means adjacent to the forward end of said kite for attaching a fish line thereto.

2. The underwater fishing kite of claim 1 wherein said vane is wider at the forward end than at the rearward end to form a tapered configuration as viewed in plan.

3. The underwater fishing kite of claim 1 wherein
   (a) said vane is wider at the forward end than at the rearward end to form a tapered configuration as viewed in plan,
   (b) said vane being rounded at the front.

4. The underwater fishing kite of claim 1 wherein the shape of said vane at the forward end is concave downward in transverse cross section.

5. The underwater fishing kite of claim 1 wherein
   (a) the shape of said vane at the forward end is concave downward in transverse cross section,
   (b) said vane leading rearwardly from said concave portion into a downwardly angled side portion, the vertical dimension of said vane being reduced gradually toward the rear whereby the general vertical dimension of said kite along the sides including said body portion is substantially uniform.

6. The underwater fishing kite of claim 1 wherein said bottom wall has a longitudinally arcuate portion intermediate its ends.

7. The underwater fishing kite of claim 1 wherein said body portion has downturned fins at its sides adjacent the rearward end thereof.

8. The underwater fishing kite of claim 1 including ballast means in said body portion movable forwardly and rearwardly to assist the kite in ascending and descending movements in the water.

9. The underwater fishing kite of claim 8 wherein
   (a) said body portion is hollow to provide the buoyancy for the kite,
   (b) and a walled compartment in said body portion for holding said ballast means.
10. The underwater fishing kite of claim 8 wherein
    (a) said body portion includes a walled compartment,
    (b) said ballast means including loose material having a volume less than the volume of said walled compartment for movement forwardly and rearwardly.
11. The underwater fishing kite of claim 8 wherein
    (a) said body portion includes a walled compartment,
    (b) said ballast means including a liquid having a volume less than the volume of said walled compartment for movement forwardly and rearwardly.
12. The underwater fishing kite of claim 1 including added weight means adjacent to the front of the kite for causing it to nose down slightly when floating on the surface of water to put it in initial diving position.
13. The underwater fishing kite of claim 1 wherein said connector means includes
    (a) means defining a longitudinally elongated slot in the front flange through which a fish line projects downwardly,
    (b) and projecting means projecting downwardly from said body portion at about the rearward end of said slot for disconnectible connection of the fish line at a point intermediate the ends of the latter with the hook end of the fish line trailing rearwardly.
14. The underwater fishing kite of claim 13 wherein said projection means includes two posts spaced apart laterally a distance less than the diameter of a fish line whereby a fish line is arranged to be forced therebetween and held frictionally in place for normal trolling operations after first wrapping the fish line one or more times around the posts, said posts being arranged to release the fish line when a pull occurs on the hook which is of sufficient force to flip the kite vertically and pull the line out from between the posts.
15. The underwater fishing kite of claim 13 wherein said connector means includes
    (a) means defining a longitudinally elongated slot in the front flange through which a fish line projects downwardly,
    (b) and means associated with said slot for holding the fish line at two or more positions along said slot for controlling the trolling depth of the kite.
16. An underwater fishing kite comprising
    (a) a body portion having forward and rearward ends,
    (b) said body portion being arranged to dive down in water when pulled forwardly,
    (c) means defining a longitudinally elongated slot in said body portion through which a fish line projects downwardly,
    (d) said slot being disposed adjacent to the front on the longitudinal center line of the body portion,
    (e) and projection means projecting downwardly from said body portion at about the rearward end of said slot for disconnectible connection of the fish line at a point intermediate the ends of the latter with the hook end of the fish line trailing rearwardly.

References Cited

UNITED STATES PATENTS

| | | | |
|---|---|---|---|
| 1,582,713 | 4/1926 | Welch | 43—42.05 |
| 2,236,353 | 3/1941 | Minser | 43—42.05 |
| 2,566,029 | 8/1951 | Louthan | 43—43.13 |
| 2,891,345 | 6/1959 | Uhlen | 43—43.13 |
| 2,983,065 | 5/1961 | Ferguson et al. | 43—42.39 X |
| 3,357,124 | 12/1967 | Stepacoff et al. | 43—42.39 X |

FOREIGN PATENTS

| | | | |
|---|---|---|---|
| 1,313,296 | 11/1962 | France | 43—43.13 |

SAMUEL KOREN, Primary Examiner

D. J. LEACH, Assistant Examiner

U.S. Cl. X.R.

43—42.05, 42.39, 42.49

UNITED STATES PATENT OFFICE
CERTIFICATE OF CORRECTION

Patent No. 3,613,290  Dated October 19, 1971

Inventor(s) CLISSOLDE L. LOUTHAN

It is certified that error appears in the above-identified patent and that said Letters Patent are hereby corrected as shown below:

In each of columns 7, line 23 and column 8, line 2, before "front" insert: --vane at the-- and change "flange" to -- of the body portion--.

Column 7, line 40, change "13" to --1--.

Signed and sealed this 16th day of April 1974.

(SEAL)
Attest:

EDWARD M. FLETCHER, JR.  C. MARSHALL DANN
Attesting Officer  Commissioner of Patents